Sept. 16, 1952 C. C. GRIFFITHS 2,610,342
VEHICLE WASHING APPARATUS
Filed Dec. 31, 1946 3 Sheets-Sheet 1
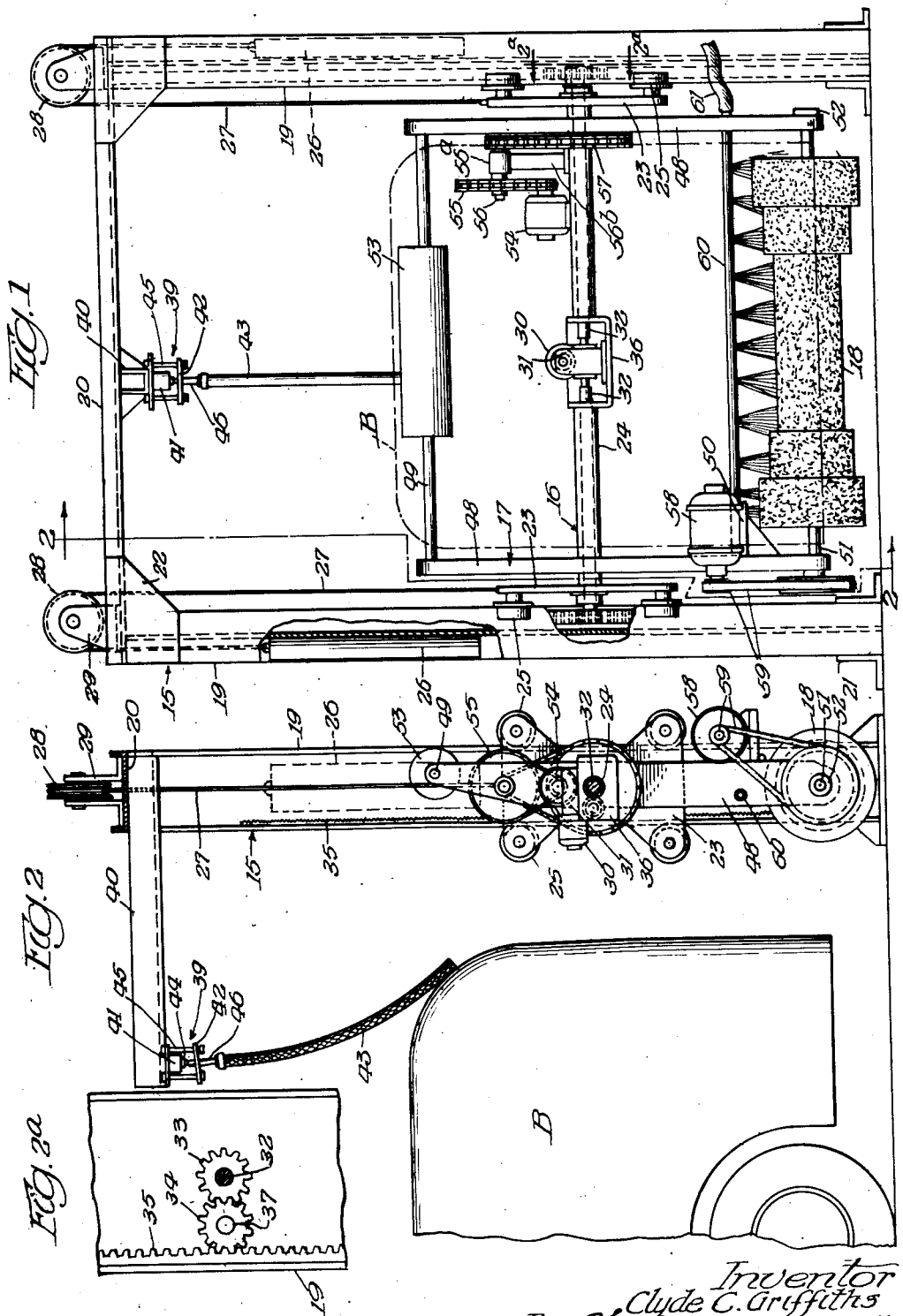
Inventor
Clyde C. Griffiths
By Fred Gerlach atty Sept. 16, 1952     C. C. GRIFFITHS     2,610,342
VEHICLE WASHING APPARATUS
Filed Dec. 31, 1946     3 Sheets-Sheet 2
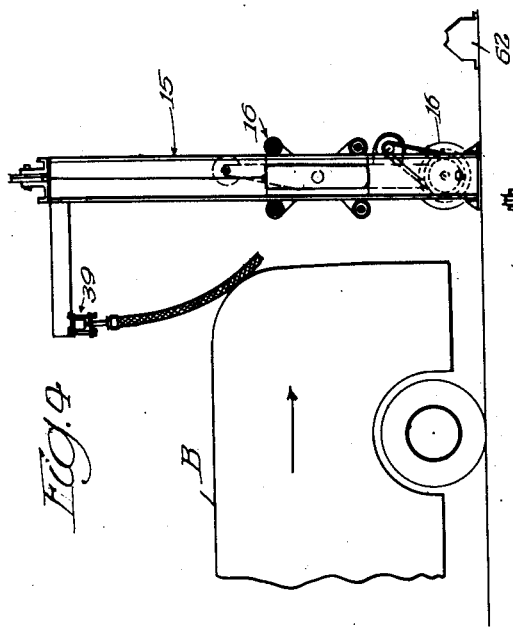
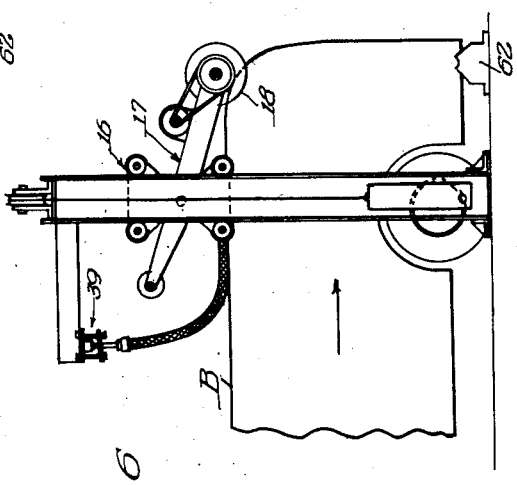
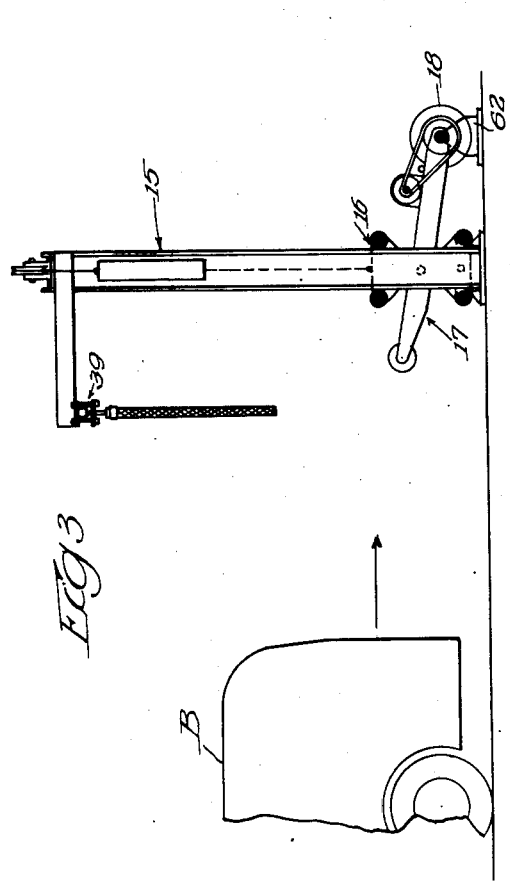
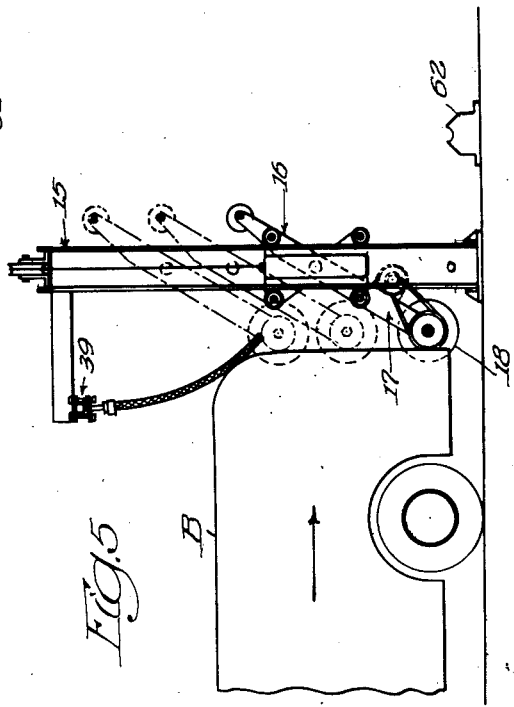
Inventor
Clyde C. Griffiths
By Fred Gerlach
Atty.

Sept. 16, 1952        C. C. GRIFFITHS        2,610,342
VEHICLE WASHING APPARATUS
Filed Dec. 31, 1946        3 Sheets-Sheet 3
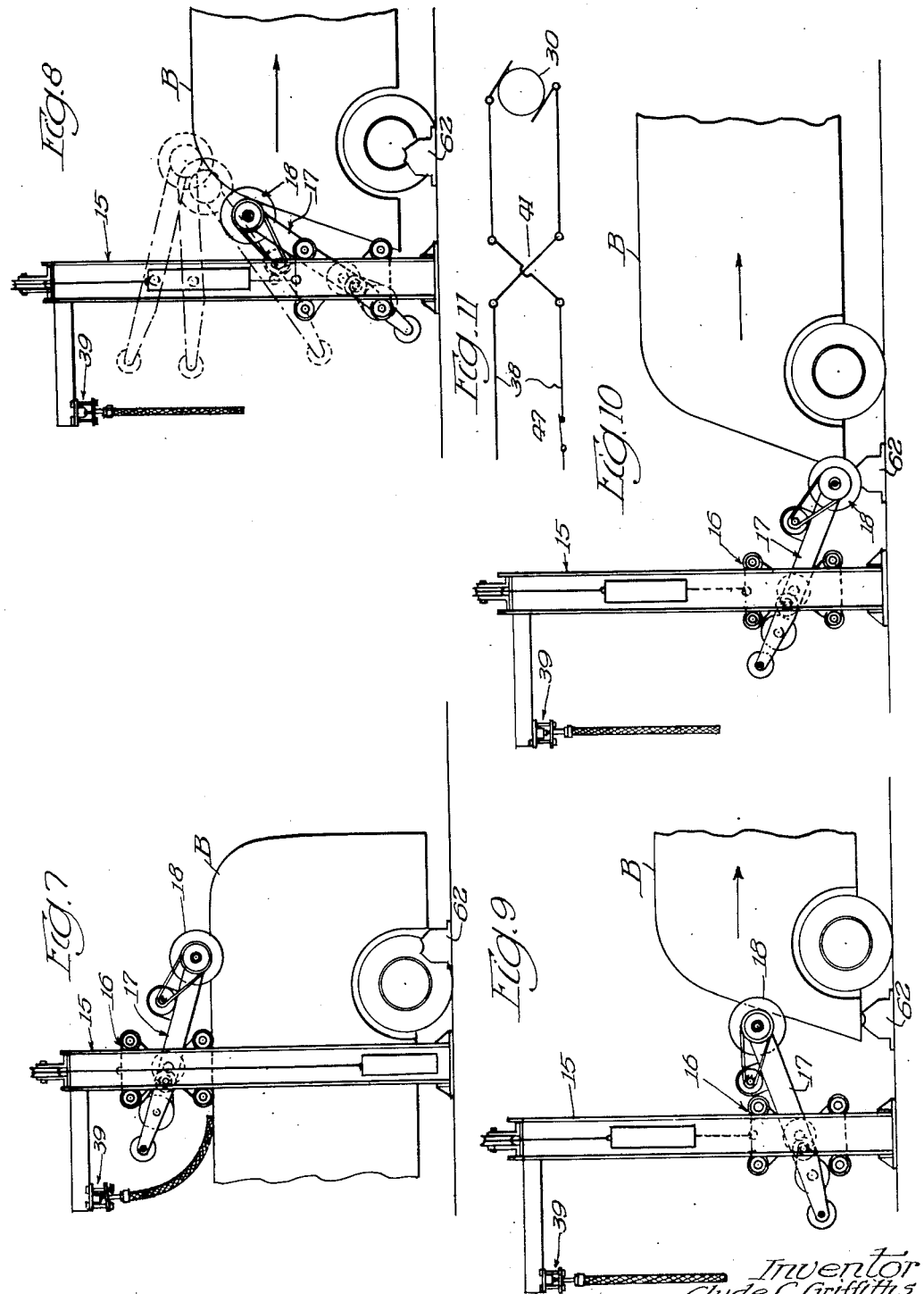
Inventor
Clyde C. Griffiths
By:— Fred Gerlach Atty.

Patented Sept. 16, 1952

2,610,342

UNITED STATES PATENT OFFICE 2,610,342

VEHICLE WASHING APPARATUS

Clyde C. Griffiths, Harvey, Ill., assignor to Whiting Corporation, Harvey, Ill., a corporation of Illinois Application December 31, 1946, Serial No. 719,508

9 Claims. (Cl. 15—21)

1

The present invention relates generally to vehicle washing apparatus. More particularly the invention relates to that type of apparatus which is designed primarily for use in washing a bus or like vehicle having normally closed and substantially flat front and rear portions, is adapted to effect washing of the bus during propulsion of the latter therepast, and comprises as its principal parts or components: (1) an upstanding supporting structure; and (2) an elongated, rotatably mounted, power driven brush on the supporting structure.

One object of the invention is to provide a washing apparatus of this type which is an improvement upon, and has certain inherent advantages over, previously designed apparatus for the same purpose and of the same general character and is characterized by the fact that the brush is so designed, arranged, mounted and controlled that it serves in connection with drive or propulsion of the bus past the apparatus in a forward direction successively to wash the front, roof and rear portions of the bus.

Another object of the invention is to provide a washing apparatus of the last mentioned character in which the rotatable, power driven brush extends horizontally and is carried by a carriage which is vertically slidable with respect to the supporting structure in order that in connection with a bus washing operation the brush is capable of being moved upwards over the front portion of the bus and then after effecting washing of the roof portion of the bus is capable of being moved or shifted downwards over the rear portion of the bus.

Another object of the invention is to provide a washing apparatus of the type and character last mentioned in which the carriage on which the horizontally extending brush is carried is raised and lowered by power means and such means is automatically controlled so that the carriage is first slid or shifted upwards after the bus to be washed is brought into a position wherein the front portion thereof is directly in front of the brush, is then held or maintained in an elevated position in order that the brush effects washing of the roof portion as the bus is propelled past the apparatus, and is finally slid or shifted downwards after washing of the roof portion in order that the brush effects washing of the rear portion of the bus.

Another object of the invention is to provide a washing apparatus of the aforementioned type and character in which the power means for effecting upward and downward sliding movement of the carriage with respect to the supporting structure is in the form of a reversible electric torque motor and is controlled by a so-called dangle switch which is located so that it is engaged by the roof portion of the bus to be washed.

Another object of the invention is to provide a washing apparatus of the type under consideration in which the rotary horizontally extending brush is mounted with respect to the carriage by a frame which is pivoted to swing about a horizontal axis and has means associated with it whereby during a bus washing operation it is yieldingly swung in such direction as to bring the brush into firm contact with the bus.

A further object of the invention is to provide a washing apparatus of the type last mentioned in which the means for yieldingly swinging the frame for the brush is in the form of an electric torque motor.

A still further object of the invention is to provide a washing apparatus which is generally of new and improved construction, embodies a novel arrangement of parts and is characterized by high efficiency as well as simplicity of design and low cost of construction or fabrication.

Other objects of the invention and the various advantages and characteristics of the present washing apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a front view of a washing apparatus embodying the invention, certain parts being broken away for purposes of illustration;

Figure 2 is a vertical transverse section taken on the line 2—2 of Figure 1, and illustrating in detail the manner in which the carriage which serves, through the medium of the pivotally mounted frame, to support or carry the horizontally extending brush, is mounted for vertical sliding movement with respect to the supporting structure;

Figure 2a is an enlarged vertical transverse section taken on the line 2a—2a of Figure 1 and and showing in detail certain parts of the means for effecting upward and downward sliding movement or shift of the carriage;

Figure 3 is a side elevation showing the carriage in its fully down or inoperative position and a bus to be washed approaching the apparatus;

Figure 4 is a side elevation showing the bus after it has been brought to rest in a position wherein the front portion is adjacent the brush and the front part of its roof portion is in such contact with the dangle switch that the latter operates to effect such drive of the reversible electric torque motor for the carriage as to effect raising of the carriage and resultant elevation of the brush;

Figure 5 is a side elevation like Figure 4 but showing, however, the brush in contact with the front portion of the bus and the carriage being slid or shifted upwards;

Figure 6 is a side elevation showing the position of the brush after it has passed upwards over the front of the front portion of the bus and the carriage has reached its uppermost position;

Figure 7 is a side elevation showing the bus as it is being propelled past the apparatus and while the brush is in engagement with its roof portion;

Figure 8 is a side elevation showing the bus after it has been propelled almost past the apparatus and while the brush and carriage are moving downwards in connection with washing the rear portion of the bus;

Figure 9 is a side elevation showing the brush after it has substantially completed washing of the rear portion of the bus;

Figure 10 is a side elevation showing the position of the brush at the conclusion of a bus washing operation;

Figure 11 is a diagrammatic illustration of the electrical circuit for the reversible electric torque motor constituting part of the power means for effecting upward and downward sliding movement or shift of the carriage with respect to the supporting structure.

The apparatus which is shown in the drawings constitutes the preferred form or embodiment of the invention. It is designed and adapted automatically to wash the front, roof and rear portions of a bus B as the latter is propelled or driven past the apparatus and as its principal components or parts comprises a supporting structure 15, a carriage 16, a frame 17 and a brush 18. As hereinafter described more in detail the carriage 16 is mounted for vertical sliding movement on the supporting structure 15, the frame 17 is mounted on the carriage so that it is capable of swinging or rotating on a horizontal axis, and the brush 18 is mounted rotatably on the frame.

The supporting structure 15 is shaped conformably to an inverted U and consists of a pair of laterally spaced standards 19 and an upper cross member 20. The standards are in the form of I-beams and have the lower ends thereof fixedly anchored by angle brackets 21 to the floor of the establishment in which the washing apparatus is employed. The lateral spacing of the standards is such that the bus B may be propelled between them as indicated in the drawings. The I-beams constituting the standards 19 of the supporting structure are arranged so that the webs thereof are in parallel relation with the path of travel of the bus during a washing operation by the apparatus and the flanges thereof extend transversely of said path. The height of the standards is materially greater than the height of the bus B. The upper cross member 20 of the supporting structure 15 is in the form of a channel beam and extends horizontally. It has the ends thereof fixedly connected to the ends of the standards 19 by way of gusset plates 22 and is arranged so that the flanges thereof extend upwards.

The carriage 16 comprises a pair of parallel, vertically extending, substantially rectangular plates 23 and a horizontally extending tubular member 24. The plates are located or positioned directly inwards of the standards 19 and carry at their corners flanged rollers 25. The latter straddle, and are adapted to travel vertically along, the inner portions of the flanges of the I-beams constituting the standards 19 and form, in effect, sliding connections whereby the carriage 16 is connected to the standards so that it is shiftable vertically relatively to the latter. The tubular cross member 24 extends between the plates 23 and serves as a medium or instrumentality for connecting the plates fixedly or rigidly together. The ends of the member 24 extend through holes in the central portions of the plates 23 and are welded to the hole defining portions of the plates. The carriage 16 is counterbalanced by way of a pair of counterweights 26. The latter travel vertically in the spaces between the outer portions of the flanges of the I-beams constituting the standards of the supporting structure, and are operatively connected to the carriage 16 by a pair of cables 27. The central portions of these cables are trained over vertically extending sheaves 28 which are located over the ends of the cross member 20 and are connected thereto by way of brackets 29. Certain ends of the cables 27 are suitably connected to the upper ends of the counterweights 26 and the other ends of the cables are connected to eyes on the upper central portions of the plates 23 of the carriage. Preferably the counterweights 26 are of such weight that they serve to counterbalance the combined weight of the carriage 16, the frame 17, the brush 18 and the various auxiliary parts that are associated therewith. Vertical sliding movement of the carriage with respect to the supporting structure 15 is effected by way of power means in the form of a reversible electric torque motor 30, a speed reducer 31, a pair of shafts 32, a pair of pinions 33, a pair of idler pinions 34 and a pair of vertically extending racks 35. The motor 30 is fixedly mounted on a bracket 36 which is connected to, and forms a portion of, the central portion of the tubular cross member 24 of the carriage 16. The speed reducer 31 is mounted on the bracket 36. It is of standard or conventional construction and has the drive shaft thereof connected to the armature of the motor 30. The driven shaft of the speed reducer 31 is arranged in coaxial relation with the interior of the tubular cross member 24. The shafts 32 are rotatably mounted in, and extend longitudinally through, the end portions of the tubular cross member 24 and have the inner ends thereof connected to the ends of the driven shaft of the speed reducer 31. The outer ends of the shafts 32 project beyond the end extremities of the cross member 24 and have the pinions 33 keyed or otherwise fixedly secured thereto. The idler pinions 34 mesh with the pinions 33 as best shown in Figure 2a and are rotatably mounted on spindles 37. The latter are mounted on the plates 23 of the carriage 16. The vertically extending racks 35 have the idler pinions 34 in mesh therewith and are connected to, and extend lengthwise of, the inner portions of certain of the flanges of the I-beams constituting the standards 19. When the electric torque motor 30 is driven in one direction it operates through the medium of the speed reducer 31, the shafts 32, the pinions 33 and 34 and the racks 35, to slide or shift upwards the carriage 16. Reverse rotation on the part of the electric torque motor 30 results in lowering or downward shift of the carriage. The motor 30 is supplied with current by way of a pair of line conductors 38 and is controlled by a dangle switch 39. The latter is carried by, and depends from, a horizontally extending bar 40 which, as shown in the drawings, is disposed in parallel relation with the path of movement of the bus B during a washing operation and has one end thereof welded or otherwise fixedly secured to the central portion of the cross member 20 of the supporting structure 15. The dangle switch 39 is connected to the other or outer end of the bar 40 and consists of a reversing switch 41, a reversing switch actuating plate 42 and a hose 43. The reversing switch 41 has a downwardly extending push button 44 and is arranged so that when the push button is in its normal or down position current is so supplied to the reversible electric torque motor 30 that the latter is driven to effect lowering or downward sliding movement of the carriage with respect to the supporting structure 15. The actuating plate 42 is located directly beneath the button 44 of the reversing switch 41 and is supported by way of posts 45 in order that it is free to tilt. When the plate 42 is tilted in any direction from a normal horizontal position it serves to shift upwards the push button 44 of the reversing switch. Upward shift of the button effects a reversing of the switch 41 and results in the motor 30 being so supplied with current that it operates to effect raising or upward sliding movement of the carriage 16 relatively to the supporting structure 15. The posts 45 which serve, as heretofore pointed out, loosely or freely to carry the reversing switch actuating plate 42, are connected to, and depend from, the outer end of the bar 40. Said plate 42 is provided at the central portion thereof with a downwardly extending stem 46 and this is rigid with the plate. The hose 43 is formed of rubber or any other suitable material that is capable of flexing, and has its upper end connected to the lower end of the stem 46. The length of the hose 43 is such that the lower end projects normally beneath the roof portion of the bus B. As shown in the drawings, the bar 40 supports the dangle switch 39 so that the lower end of the hose is contacted by the front part of the roof portion of the bus before the front end of the bus passes between the standards 19 of the supporting structure 15 during a washing operation. When the hose is limp or straight as the result of not being in contact with the bus the reversing switch actuating plate 42 extends horizontally and hence is out of engagement with, and has no effect on, the push button 44 and the reversible electric torque motor therefore operates, as previously pointed out, to cause downward sliding movement of the carriage. When the hose 43 is flexed or angularly displaced due to contact with the roof of the bus to be washed the plate 42 is tilted and hence reverses the switch 41 to the end that the reversible electric torque motor 30 effects raising of the carriage 16. A manually operable switch 47 is included in one of the line conductors 38 ahead of the reversing switch 41 in order that the supply of current to the motor 30 may be cut off when the apparatus is not in use. When the switch 47 is closed the motor is driven either to lower the carriage or raise the carriage, depending upon the position of the reversing switch 41 constituting part of the dangle switch 39. When the bottom rollers 25 on the plates 23 of the carriage strike certain of the angle brackets 21 in connection with downward sliding movement of the carriage the carriage is arrested and the motor 30 while still supplied with current stalls. When, in connection with upward sliding movement of the carriage, the upper rollers 25 strike the gusset plates 22 the carriage is arrested and the motor 30 stalls while subject to the further supply of electric current thereto.

It is contemplated that in connection with a washing operation the bus will be propelled toward the apparatus until the front of the roof portion of the bus contacts and angularly deflects the hose 43 of the dangle switch 39. At such time the bus is stopped. As soon as the hose 43 is angularly deflected the electric motor 30, as previously pointed out, operates to raise the carriage. After the carriage is raised to its fullest extent the bus is propelled forwards between the standards 19 of the supporting structure 15. During forward travel of the bus the lower end of the hose 43 travels on the roof portion of the bus as shown in Figures 6 and 7. After the bus passes the hose 43 (see Figures 8, 9 and 10) the hose 43 flexed downwards into its limp position and, due to resultant action of the dangle switch, results in the motor 30 effecting downward sliding of the carriage 16 relatively to the supporting structure. The dangle switch 39 and the reversible electric torque motor 30 together with the gearing that is associated with the motor exemplify automatic power means whereby the carriage is first slid or shifted upwards after the bus to be washed is brought into a position wherein the front portion thereof is directly in front of the supporting structure, is then held or maintained in an elevated position as the bus is propelled past the apparatus, and is finally slid or shifted downwards after disengagement of the hose 43 of the dangle switch from the rear end of the roof portion of the bus.

The frame 17 is disposed between the standards 19 of the supporting structure 15 and is mounted on the carriage so that it is shiftable vertically therewith while at the same time it is free to pivot or swing relatively thereto about a horizontal axis. It carries the rotatable brush 18 and consists of a pair of parallel laterally spaced arms 48 and a crossrod 49. The central portions of the arms 48 have circular holes through which the end portions of the tubular cross member 24 extends loosely to the end that the frame is permitted to rock or swing relatively to the carriage. The crossrod 49 extends between, and is fixedly connected to, certain ends of the arms 48 and serves rigidly to cross connect the arms 48 so that they swing or rock in unison. The brush 18 is mounted on, and fixedly secured to, a shaft 51. The latter extends horizontally and has the ends thereof journalled in bearings 52 on the ends of the frame-arms 48 that are remote from the crossrod 49. The frame 17 is counterbalanced by way of a counterweight 53 which, as best shown in Figure 1, is mounted on the central portion of the crossrod 49.

The frame has associated with it means whereby during a bush washing operation it is yieldingly swung in a clockwise direction as viewed in Figures 2 to 10, inclusive, in order to bring the brush 18 into firm contact with the bus. Such means comprises a unidirectional torque motor 54, a sprocket and chain connection 55, a shaft 56 and a sprocket and chain connection 57. The motor 54 is fixedly mounted on the tubular cross member 24 of the carriage 16 and is disposed adjacent one of the arms 48 of the frame 17. As shown in Figure 1, the motor 54 is arranged so that the armature shaft therefor is parallel to said cross member 24. The sprocket and chain connection 55 serves operatively or drivably to connect the armature of the motor 54 to the shaft 56 and consists of a small sized sprocket on the armature shaft, a large sized sprocket on one end of the shaft 56 and an endless chain around the two sprocket wheels. The shaft 56 is journalled in a bearing 56a which is mounted on an upstanding post 56b, the lower end of which is fixedly secured to the tubular cross member 24 of the carriage 16. The sprocket and chain connection 57 consists of a small sized sprocket on the shaft 56, a large sized sprocket and an endless chain around the two sprockets. The large sized sprocket of the connection 57 extends loosely around the tubular cross member 24 and is fixedly connected to the frame-arm adjacent which the unidirectional electric torque motor 54 is disposed. It is contemplated that in connection with a bus washing operation current will be continuously supplied to the electric motor 54 and that such motor, through the medium of the two sprocket and chain connections 55 and 57, will cause the frame 17 to be swung so that the brush 18 is always in firm contact with the bus. When the frame is swung so that the brush 18 is in contact with the bus the motor 54 stalls. Because, however, such motor is a unidirectional torque motor it operates yieldingly to hold the brush in firm contact with the bus. As heretofore pointed out the motor 54 serves yieldingly to swing the frame 17 together with the brush 18 in a clockwise direction as viewed in Figures 2 to 10, inclusive, of the drawings.

The brush 18 is horizontally elongated and consists of a plurality of side by side cores and radially extending bristles on the cores. The cores are clamped or otherwise fixedly secured to the central portion of the shaft 51. An electric motor 58 and a pulley and belt connection 59 serve to drive or rotate the brush 18 during a bus washing operation. The motor 58 is fixedly mounted on a bracket 58 on the frame 17 and is arranged so that the armature shaft thereof extends parallel to the brush shaft 51. The pulley and belt connection 59 consists of a small sized pulley on the exposed end of the armature shaft of the motor 58, a large sized pulley on one end of the shaft 51 and an endless belt around the two pulleys. It is contemplated that throughout a car washing operation the motor 58 will be continuously supplied with current to the end that the brush 18 is constantly driven. A horizontally extending pipe 60 serves to spray or jet streams of water or other washing liquid onto the brush. This pipe is located directly inwards of the crossbar 50 of the frame 17 and extends between the frame-arms 48. It embodies a longitudinal series of spaced apart jet openings (not shown) and has one end thereof connected to a source of water or other washing liquid under pressure by way of a flexible hose 61. The jet openings in the pipe 60 face in the direction of the brush. When the apparatus is not in use a support 62 serves to support the frame 17 in the position and manner shown in Figures 3 and 10. This support is fixed to the floor of the establishment in which the apparatus is employed and is located on the side of the supporting structure 15 that is opposite the side from which the dangle switch supporting bar 40 extends. It is located in vertical alignment with, and is adapted to receive and support, the large sized pulley of the pulley and belt connection 59.

The operation of the apparatus is as follows:

When it is desired to wash the bus B the bus is driven towards the supporting structure 15 of the apparatus, as heretofore pointed out. As soon as the frame 17 is positioned directly in front of the bus and so that the front end of the roof portion thereof engages and angularly deflects the hose 43 of the dangle switch 39 it is stopped. Immediately upon angular deflection of the hose of the dangle switch the reversing switch 41 is shifted so that the reversible electric torque motor 30 is caused to be driven so as to raise or slide upwards the carriage 16. As soon as the carriage is initially raised by the motor 30 the unidirectional electric torque motor 54 comes into play and operates so to swing the frame 17 as to bring the rotary power driven brush 18 into contact with the front portion of the bus. In connection with raising of the carriage the brush travels upwards over or across the front portion of the bus and effects washing thereof, as shown in Figure 5. As soon as the carriage 16 is raised to its fullest extent (see Figure 6) the bus is propelled forwards. Forward propulsion of the bus results in counterclockwise swinging of the brush frame 17, as shown in Figure 6. Continued forward propulsion of the bus results in the brush traversing and effecting washing of the roof portion of the bus. As soon as the bus passes beyond the dangle switch 39 the hose 43 straightens out and results in the reversing switch 41 assuming its normal position wherein it causes such drive of the reversible electric torque motor 30 as to effect lowering or downward shift of the carriage 16. As the carriage moves downward (see Figures 8 and 9) the brush 18 sweeps downwards across the rear portion of the bus and effects the desired washing thereof. As soon as the brush reaches the bottom of the rear portion of the bus the frame 17 comes to rest as the result of the large sized pulley of the connection 59 being brought into engagement with the support 62. It is contemplated that directly after a bus washing operation, the supply of current to the electric motors 30, 54 and 58 will be cut off.

The herein described washing apparatus effectively and efficiently fulfills its intended purpose and is essentially automatic. It is comparatively simple so far as design and construction are concerned and is characterized by the fact that raising and lowering of the carriage is effected without manual control during a bus washing operation. It is further characterized by the fact that the unidirectional electric torque motor 54 so swings the brush carrying frame that the brush is always in firm contact with the bus regardless of whether it is washing the front, roof or rear portion.

Whereas the apparatus has been described and illustrated as a medium for washing a bus it is to be understood that it may be used also to wash any other vehicle having normally closed and substantially flat front and rear portions. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. An apparatus adapted to wash a vehicle as the latter is moved past it and comprising an upstanding supporting structure of greater height than the vehicle, a carriage mounted on the supporting structure so that it is slidable bodily upwards and downwards, a horizontal brush carried by the carriage so that it extends transversely across the path of travel of the vehicle, and adapted when the front portion of the vehicle is positioned adjacent the supporting structure and the carriage is slid upwards to sweep across and wash said front portion of the vehicle, when the carriage is retained in an elevated position and the vehicle is moved past the supporting structure to engage and effect washing of the roof portion of the vehicle, and when the carriage is slid downwards after the vehicle passes said supporting structure to sweep downwards across and wash the rear portion of the vehicle, and power means operative to slide the carriage upwards and downwards relatively to the supporting structure and embodying a reversible electric motor on said carriage.

2. An apparatus adapted to wash a vehicle as the latter is moved on a runway past it and comprising a rigid supporting structure extending upwards from the runway to a height greater than that of the vehicle, a carriage mounted on the supporting structure so that it is slidable vertically back and forth between a lowered position wherein it is positioned directly above the runway and a raised position wherein it is disposed at a height in excess of that of the vehicle, a horizontal brush carried by the carriage so that it extends transversely across the path of travel of the vehicle, and adapted when the front portion of the vehicle is positioned adjacent the supporting structure and the carriage is slid from its lowered position to its raised position to sweep upwards across and wash said front portion of the vehicle, when the carriage is retained in its said raised position and the vehicle is moved past the supporting structure to engage and effect washing of the roof portion of the vehicle, and when the carriage is slid from its raised position to its said lowered position after the vehicle passes said supporting structure to sweep downwards across and wash the rear portion of the vehicle and power means operative to slide the carriage back and forth between said positions and embodying an electric motor on said carriage.

3. An apparatus adapted to wash a vehicle as the latter is moved on a runway past it and comprising an upstanding inverted U-shaped rigid supporting structure extending upwards from, and arranged in straddled relation with, the runway, and embodying a pair of laterally spaced standards of greater height than the height of the vehicle, a horizontally elongated carriage extending between the standards and mounted thereon so that it is slidable bodily in a rectilinear path back and forth between a lowered position wherein it is positioned directly above the runway and a raised position wherein it is disposed at a height in excess of that of the vehicle, a horizontal brush carried by the carriage so that it extends transversely across the path of travel of the vehicle, and adapted when the front portion of the vehicle is positioned adjacent the supporting structure and the carriage is slid from its lowered position to its raised position to sweep upwards across and wash said front portion of the vehicle, when the carriage is retained in its said raised position and the vehicle is moved past the supporting structure to engage and effect washing of the room portion of the vehicle, and when the carriage is slid from its raised position to its said lowered position after the vehicle passes said supporting structure to sweep downwards across and wash the rear portion of the vehicle, and motor actuated means for sliding the carriage between said positions.

4. An apparatus adapted to wash a vehicle as the latter is moved on a runway past it and comprising an upstanding inverted U-shaped rigid supporting structure extending upwards from, and arranged in straddled relation with, the runway, and embodying a pair of laterally spaced standards of greater height than the height of the vehicle, a horizontally elongated carriage extending between the standards and mounted thereon so that it is slidable bodily in a rectilinear path back and forth between a lowered position adjacent the runway and a raised position wherein it is disposed at a height in excess of that of the vehicle, a horizontal brush carried by the carriage so that it extends transversely across the path of travel of the vehicle, and adapted when the front portion of the vehicle is positioned adjacent the supporting structure and the carriage is slid from its lowered position to its raised position to sweep upwards across and wash said front portion of the vehicle, when the carriage is retained in its said raised position and the vehicle is moved past the supporting structure to engage and effect washing of the roof portion of the vehicle, and when the carriage is slid from its raised position to its said lowered position after the vehicle passes said supporting structure to sweep downwards across and wash the rear portion of the vehicle, and power means adapted to slide the carriage upwards and downwards relatively to the supporting structure and embodying a reversible electric motor mounted on the carriage, pinions disposed at the ends of the carriage and connected for drive by the motor, and vertical racks connected fixedly to the standards and in mesh with the pinions.

5. An apparatus adapted to wash a vehicle as the latter is moved past it and comprising a rigid upstanding supporting structure, a carriage mounted on the supporting structure so that it is slidable bodily upwards and downwards, a horizontally elongated frame carried by the carriage so that it extends transversely across the path of travel of the vehicle and is free to swing about a horizontal axis extending transversely across said path, an elongated horizontal brush mounted on the frame in parallel and laterally offset relation with said axis, extending also transversely across said path and adapted when the front portion of the vehicle is positioned adjacent the supporting structure and the carriage is slid upwards to sweep upwards across and wash said front portion of the vehicle, when the carriage is retained in an elevated position and the vehicle is moved past the supporting structure to engage and effect washing of the room portion of the vehicle, and when the carriage is slid downwards after the vehicle passes said supporting structure to sweep downwards across and wash the back or rear portion of the vehicle, and means for yieldingly swinging the frame in such direction that the brush is caused firmly to engage said portions of the vehicle during a washing operation.

6. An apparatus adapted to wash a vehicle as the latter is moved by it and comprising an upstanding supporting structure, a carriage mounted on the supporting structure so that it is slidable bodily upwards and downwards, a horizontally elongated frame carried by the carriage so that it extends transversely across the path of travel of the vehicle and is free to swing about a horizontal axis extending transversely across said path, an elongated horizontal brush mounted on the frame in parallel and laterally offset relation with said axis, extending also transversely across said path and adapted when the front portion of the vehicle is positioned adjacent the supporting structure and the carriage is slid upwards to sweep upwards across and wash said front portion of the vehicle, when the carriage is retained in an elevated position and the vehicle is moved past the supporting structure to engage and effect washing of the roof portion of the vehicle, and when the carriage is slid downwards after the vehicle passes said supporting structure to sweep downwards across and wash the back or rear portion of the vehicle, and means including a unidirectional electric torque motor on the carriage for yieldingly swinging the frame in such direction that the brush is caused firmly to engage said portions of the vehicle during a washing operation.

7. An apparatus adapted to wash a vehicle as the latter is moved by it and comprising an upstanding supporting structure, a carriage mounted on the supporting structure so that it is slidable bodily upwards and downwards, a horizontally elongated frame carried by the carriage so that it extends transversely across the path of travel of the vehicle and is free to swing about a horizontal axis extending transversely across said path, an elongated horizontal brush mounted on the frame in parallel and laterally offset relation with said axis, extending also transversely across said path, and adapted when the front portion of the vehicle is positioned adjacent the supporting structure and the carriage is slid upwards to sweep upwards across and wash said front portion of the vehicle, when the carriage is retained in an elevated position and the vehicle is moved past the supporting structure to engage and effect washing of the roof portion of the vehicle, and when the carriage is slid downwards after the vehicle passes said supporting structure to sweep downwards across and wash the back or rear portion of the vehicle, means between the carriage and the frame for yieldingly swinging the frame in such direction that the brush is caused firmly to engage said portions of the vehicle during a washing operation, and means including an electric motor mounted on the frame for driving the brush.

8. A vehicle washing apparatus comprising an upstanding inverted U-shaped supporting structure embodying a pair of laterally spaced standards, a horizontally elongated carriage extending between the standards and mounted thereon so that it is slidable bodily upwards and downwards, a horizontally elongated frame disposed between the standards and carried by the carriage so that it is free to swing about a horizontal axis, an elongated horizontal brush mounted on the frame in parallel and laterally offset relation with said axis, and means for yieldingly swinging the frame in one direction.

9. A vehicle washing apparatus comprising an upstanding inverted U-shaped supporting structure embodying a pair of laterally spaced standards, a horizontally elongated carriage extending between the standards and mounted thereon so that it is movable bodily upwards and downwards, a horizontally elongated frame disposed between the standards and carried by the carriage so that it is free to swing about a horizontal axis, an elongated horizontal brush mounted on the frame in parallel and laterally offset relation with said axis, and means including a unidirectional electric torque motor on the carriage for yieldingly swinging the frame in one direction.

CLYDE C. GRIFFITHS.

REFERENCES CITED

The following references are of record in the file of this patent:

UNITED STATES PATENTS

| Number | Name | Date |
|---|---|---|
| 725,119 | McCaffery | Apr. 14, 1903 |
| 729,624 | Mason | June 2, 1903 |
| 986,531 | Wilson | Mar. 14, 1911 |
| 1,643,866 | Welser | Sept. 27, 1927 |
| 1,666,170 | Fitzpatrick | Apr. 17, 1928 |
| 1,827,887 | Gillespie | Oct. 20, 1931 |
| 1,887,571 | Wilson | Nov. 15, 1932 |
| 1,942,653 | Kiggins | Jan. 9, 1934 |
| 1,962,167 | Zimmer | June 12, 1934 |
| 2,025,780 | Rosebrook | Dec. 31, 1935 |
| 2,215,692 | Fleming | Sept. 24, 1940 |
| 2,242,692 | Yingling | May 20, 1941 |
| 2,257,255 | Yingling | Sept. 30, 1941 |
| 2,311,670 | Lamont | Feb. 23, 1943 |